US011875143B2

(12) United States Patent
Rusev et al.

(10) Patent No.: US 11,875,143 B2
(45) Date of Patent: *Jan. 16, 2024

(54) DEPLOYING DEVICE CAMPAIGN UPDATES TO IOT DEVICES

(71) Applicant: VMware, Inc., Palo Alto, CA (US)

(72) Inventors: Sabo Rusev, Sofia (BG); Dobromir Ivanov, Sofia (BG); Ivo Petkov, Sofia (BG); Ilya Mayorski, Sofia (BG); Militsa Borisova, Sofia (BG)

(73) Assignee: VMware, Inc., Palo Alto, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 17/194,616

(22) Filed: Mar. 8, 2021

(65) Prior Publication Data
US 2021/0191711 A1 Jun. 24, 2021

Related U.S. Application Data

(63) Continuation of application No. 16/511,748, filed on Jul. 15, 2019, now Pat. No. 10,942,728.

(51) Int. Cl.
G06F 8/65 (2018.01)
G06F 9/445 (2018.01)
H04L 41/082 (2022.01)
H04L 67/125 (2022.01)
H04L 41/08 (2022.01)
H04L 67/00 (2022.01)

(52) U.S. Cl.
CPC ............ *G06F 8/65* (2013.01); *G06F 9/44589* (2013.01); *H04L 41/082* (2013.01); *H04L 41/0886* (2013.01); *H04L 67/125* (2013.01); *H04L 67/34* (2013.01)

(58) Field of Classification Search
CPC ... G06F 8/65; G06F 9/44589; H04L 41/0886; H04L 41/082; H04L 67/125; H04L 67/34
See application file for complete search history.

(56) References Cited

U.S. PATENT DOCUMENTS

| | | | |
|---|---|---|---|
| 8,931,084 B1 * | 1/2015 | Paya | H04L 67/34 713/160 |
| 9,712,486 B2 * | 7/2017 | Johnson | H04W 12/35 |
| 10,162,968 B1 * | 12/2018 | Kumar | H04L 67/104 |
| 10,177,977 B1 * | 1/2019 | Avramov | H04L 45/033 |
| 10,637,724 B2 * | 4/2020 | Johnson | H04L 41/0803 |

(Continued)

FOREIGN PATENT DOCUMENTS

EP   3198419 B1   2/2018

OTHER PUBLICATIONS

Rahman et al., "Understanding IoT Systems: A LifeCycle Approach", 2018, Elsevier B. V. (Year: 2018).*

(Continued)

*Primary Examiner* — Wei Y Zhen
*Assistant Examiner* — Junchun Wu
(74) *Attorney, Agent, or Firm* — King Intellectual Asset Management

(57) ABSTRACT

Disclosed are various embodiments for updating IoT endpoints. A software update package can be deployed to a IoT gateway. The software package can have lifecycle scripts and software executable for installation on IoT endpoints. The lifecycle scripts represent different lifecycle phases of the update process.

20 Claims, 8 Drawing Sheets

(56) References Cited

U.S. PATENT DOCUMENTS

| | | | |
|---|---|---|---|
| 10,673,707 B2* | 6/2020 | Dhanabalan | G06F 1/3278 |
| 10,942,728 B2* | 3/2021 | Rusev | H04L 67/125 |
| 2003/0204841 A1* | 10/2003 | Nakane | G06F 8/65 |
| | | | 717/173 |
| 2006/0080656 A1* | 4/2006 | Cain | G06F 8/65 |
| | | | 434/118 |
| 2006/0206449 A1* | 9/2006 | Fletcher | G06F 8/65 |
| 2008/0065753 A1* | 3/2008 | Rao | H04L 67/125 |
| | | | 709/223 |
| 2008/0320466 A1* | 12/2008 | Dias | G06F 8/61 |
| | | | 717/176 |
| 2011/0055826 A1* | 3/2011 | Vidal | G06F 8/71 |
| | | | 717/177 |
| 2011/0131565 A1* | 6/2011 | Vidal | G06F 9/44536 |
| | | | 717/175 |
| 2012/0054736 A1* | 3/2012 | Arcese | G06F 8/65 |
| | | | 717/172 |
| 2013/0125107 A1* | 5/2013 | Bandakka | G06F 11/1433 |
| | | | 717/171 |
| 2014/0149989 A1* | 5/2014 | Kikuchi | G06F 8/65 |
| | | | 718/102 |
| 2015/0058447 A1* | 2/2015 | Albisu | H04L 12/2818 |
| | | | 709/219 |
| 2015/0074657 A1* | 3/2015 | Bhat | G06F 8/65 |
| | | | 717/170 |
| 2016/0350096 A1* | 12/2016 | Pipilas | G06F 8/65 |
| 2017/0041189 A1 | 2/2017 | Aswathanarayana et al. | |
| 2018/0191867 A1 | 7/2018 | Siebel et al. | |
| 2019/0158353 A1 | 5/2019 | Johnson et al. | |
| 2019/0238520 A1* | 8/2019 | Espinosa | H04L 9/3263 |
| 2019/0250899 A1* | 8/2019 | Riedl | H04L 9/0825 |
| 2020/0228368 A1* | 7/2020 | Ferguson | H04L 69/18 |

OTHER PUBLICATIONS

Thomas et al.,"Internet of Things", Sep. 2018, Elsevier B. V. (Year: 2018).*

Trentin et al.,"Lightweight M2M protocol: Archetyping an IoT device, and deploying an upgrade architecture", 2018, IEEE (Year: 2018).*

Mazhelis et al.,"A Framework for Evaluating Internet-of-Things Platforms: Application Provider Viewpoint", 2014, IEEE (Year: 2014).*

Seydoux et al.,"IoT-O, a Core-Domain IoT Ontology to Represent Connected Devices Networks", 2016, Springer International, pp. 561-576 (Year: 2016).*

Trentin et al., "Lightweight M2M protocol: Archetyping an IoT device, and deploying an upgrade architecture", 2018, EEE (Year: 2018).

Rahman et al., "Understanding IoT Systems: A Life Cycle Approach", 2018, Elsevier B.V. (Year: 2018).

* cited by examiner

US 11,875,143 B2

DEPLOYING DEVICE CAMPAIGN UPDATES TO IOT DEVICES

CROSS-REFERENCE TO RELATED APPLICATIONS

This application is a continuation of and claims the benefit of U.S. patent application Ser. No. 16/511,748, entitled "DEPLOYING DEVICE CAMPAIGN UPDATES TO IOT DEVICES," and filed Jul. 15, 2019, which is hereby incorporated by reference in its entirety.

BACKGROUND

As the costs for electronic components have decreased, network and computational capabilities have been added to a wide range of devices that were typically operated independently. For example, appliances have network connectivity and computing components, allowing household appliances such as a refrigerator to reorder food from the grocery store for delivery or for a washing machine or a dryer to send an alert to a smartphone indicating that the appliance is finished. Automobiles have network connectivity, allowing individual components of the automobile to connect to the Internet, such as, allowing the radio to stream music from the Internet. Even thermostats and sprinkler controllers have network connectivity, allowing adjustment of settings based on weather reports downloaded from the Internet or remote adjustment of settings using a smartphone or computing device. The ever expanding number of devices which incorporate network connectivity and computational ability is often referred to as the "Internet of Things."

However, the scale of the Internet of Things presents a number of management issues. For example, where an enterprise can have had a few hundred computers that could be manually updated by an information technology (IT) department, the number of devices in the Internet of Things can result in tens of thousands of network connected devices being deployed in an enterprise environment. Management of these devices, such as requirements to deploy software updates, at such scale strains the resources of not just IT departments, but also of many automated solutions employed by enterprises for managing network connected devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for automating the rollout of software update packages to a network connected devices, such as Internet of Things (IoT) devices. Various applications or operating systems can be installed on IoT devices. As new versions of these applications or device firmware become available, an administrator might be tasked with updating a large number of IoT devices with updated firmware and applications. However, in order to cause the new versions of the applications or device firmware to be installed on the managed IoT devices, a device campaign update must be created and executed by a management agent on a gateway that is in communication with the IoT devices in a facility. To ensure that device campaign updates run smoothly, embodiments of the disclosure can allow an administrator to create an IoT software update package that includes a manifest file and one or more software executables that contain updated firmware or applications for an IoT endpoint. The software update package can also include one or more scripts that can run various tasks on the IoT endpoint. Each script can be assigned to a particular lifecycle phase of the software update process, which is described in more detail below.

According to the disclosure, the software update process for an IoT endpoint can be managed by an IoT management agent or IoT campaign update module running on an IoT gateway with which the IoT endpoint is enrolled. The software update process can be divided into different lifecycle phases that can be executed in order to ensure consistency and ease of deployment by an administrator once a software update package is obtained by the IoT gateway. The software update package can include a manifest file, one or more scripts corresponding to the lifecycle phases, and a software executable for installation on the IoT endpoint. The lifecycle phases can include but are not limited to an entry point phase, a verification phase, an execution phase, a validation phase, an activation phase, and a reset phase, which can be an optional phase that implements remedial measures if one or more of the other lifecycle phases fails to complete.

Figure 1:
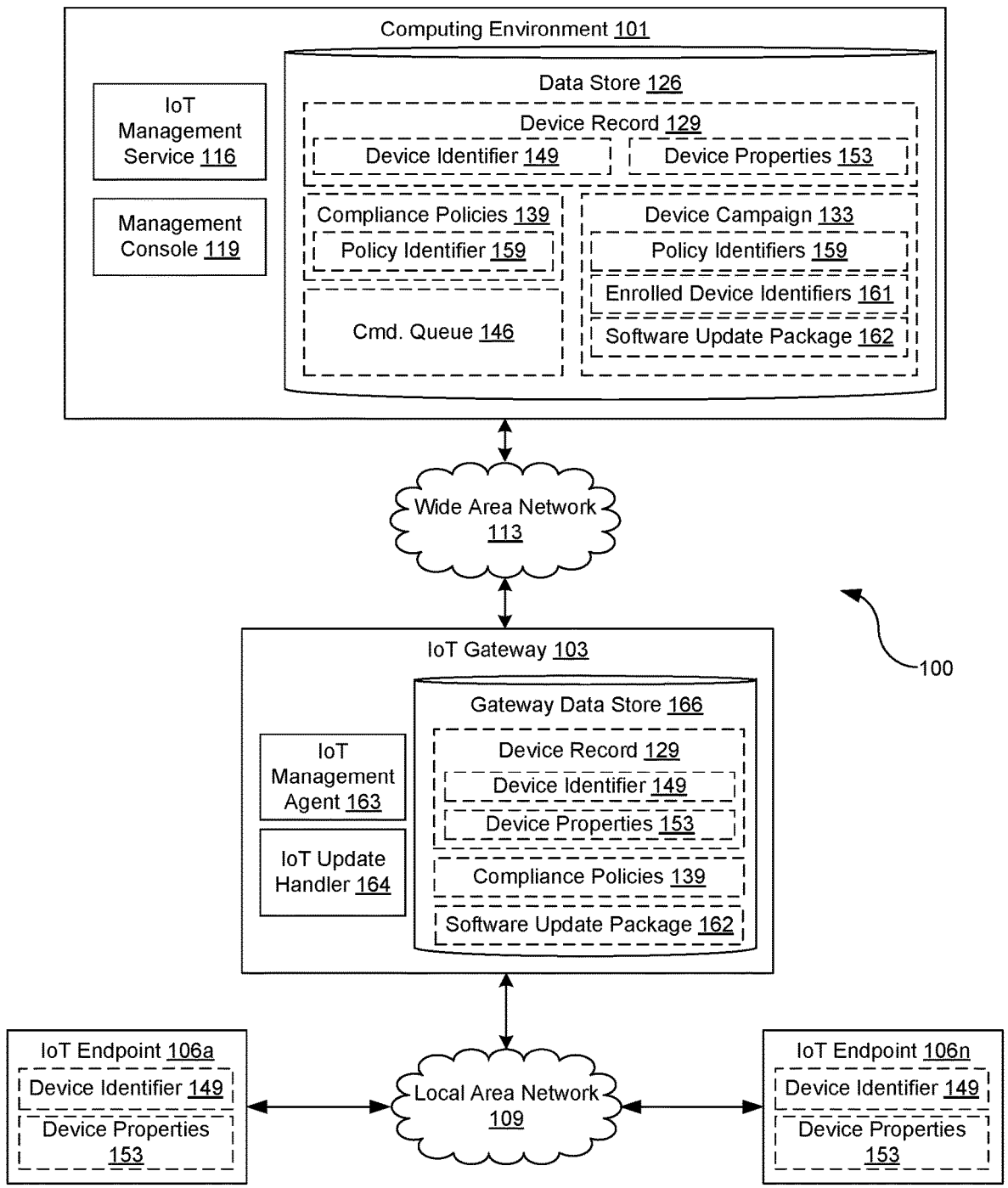
FIG. 1 is a drawing illustrating an example arrangement of a network environment according to various embodiments of the present disclosure.

As illustrated in FIG. 1, shown is a networked environment 100 according to various embodiments. The networked environment 100 includes a computing environment 101, an internet of things (IoT) gateway 103, and a number of IoT endpoints 106*a-n*. The computing environment 101, the IoT gateway 103, and the IoT endpoints 106*a-n* can be in data communication with each other. For example, multiple IoT endpoints 106*a-n* can be in data communication with each other or with an IoT gateway 103 over a local area network (LAN) 109. The IoT gateway 103 can in turn be in data communication with the computing environment 101 over a wide area network (WAN) 113.

The LAN 109 represents a computer network that interconnects computers within a limited area or a limited logical grouping. For example, the LAN 109 could include a wired or wireless network that connects computing devices within a building (such as a residence, office, school, laboratory, or similar building), collection of buildings (such as, a campus, an office or industrial park, or similar locale etc.), a vehicle (such as an automobile, an airplane, train, a boat or ship, or other vehicle), an organization (such as devices with network connectivity owned or leased by an organization), or other limited area or limited grouping of devices.

The WAN 113 represents a computer network that interconnects computers that are members of separate LANS 109. Accordingly, the WAN 113 can correspond to a network of networks, such as the Internet.

The LAN 109 and the WAN 113 can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless WI-FI® networks, BLUETOOTH® networks, microwave transmission networks, as well as other networks relying on radio broadcasts. The LAN 109 or the WAN 113 can also include a combination of two or more networks.

The computing environment 101 can include, for example, a server computer or any other system providing computing capability. Alternatively, the computing environment 101 can employ a plurality of computing devices that can be arranged, for example, in one or more server banks, computer banks, or other arrangements. Such computing devices can be located in a single installation or can be distributed among many different geographical locations. For example, the computing environment 101 can include a plurality of computing devices that together can include a hosted computing resource, a grid computing resource or any other distributed computing arrangement. In some cases, the computing environment 101 can correspond to an elastic computing resource where the allotted capacity of processing, network, storage, or other computing-related resources can vary over time.

Various applications or other functionality can be executed in the computing environment 101 according to various embodiments. The components executed on the computing environment 101, for example, can include an IoT management service 116, a management console 119, and other applications, services, processes, systems, engines, or functionality not discussed in detail herein.

Also, various data is stored in a data store 126 that is accessible to the computing environment 101. The data store 126 can be representative of a plurality of data stores 126, which can include relational databases, object-oriented databases, hierarchical databases, hash tables or similar key-value data stores, as well as other data storage applications or data structures. The data stored in the data store 126 is associated with the operation of the various applications or functional entities described below. This data can include one or more device records 129, one or more device campaigns 133, one or more compliance policies 139, one or more software packages 141, one or more command queues 146, and potentially other data.

The IoT management service 116 can oversee the operation of IoT gateways 103 and IoT endpoints 106 enrolled with the IoT management service 116. The IoT management service 116 can further cause device records 129 to be created, modified, or deleted (such as in response to enrollment or unenrollment or registration of an IoT endpoint 106). Commands issued by the IoT management service 116 for IoT endpoints 106 or IoT gateways 103, such as to apply settings or perform actions specified by compliance policies 139, can be stored in the command queue 146 by the IoT management service 116. As discussed later, the IoT gateway 103 can retrieve and execute any commands stored in the command queue 146.

The management console 119 can provide an administrative interface for configuring the operation of individual components in the networked environment 100. For example, the management console 119 can provide an administrative interface for the IoT management service 116. The management console 119 can also provide an interface for the configuration of device campaigns 133 containing software update packages that are applicable to IoT endpoints 106. Accordingly, the management console 119 can correspond to a web page or a web application provided by a web server hosted in the computing environment 101.

A device record 129 can represent an IoT endpoint 106 enrolled with and managed by the IoT management service 116. Accordingly, a device record 129 can be created by the IoT management service 116 in response to enrollment of a respective IoT endpoint 106. Therefore, each device record 129 can include a device identifier 149, one or more device properties 153, and potentially other data associated with an enrolled IoT endpoint 106.

A device identifier 149 can represent data that uniquely identifies an IoT endpoint 106 with respect to another IoT endpoint 106 and, therefore, allow one to uniquely identify one device record 129 with respect to another device record 129. Examples of device identifiers 149 include media access control (MAC) addresses of network interfaces of individual IoT endpoints 106, globally unique identifiers (GUIDs) or universally unique identifiers (UUIDs) assigned to enrolled IoT endpoints 106, international mobile equipment identifier (IMEI) numbers assigned to cellular modems of IoT endpoints 106, and tuples that uniquely identify an IoT endpoint 106 (such as a combination of a manufacturer name and serial number). However, other information can also be used as a device identifier 149 in various implementations.

A device property 153 can represent information related to or regarding an IoT endpoint 106. In some instances, a device property 153 can reflect the status of an IoT endpoint 106 or a component of an IoT endpoint 106. Examples of device properties 153 can include information about the IoT endpoint 106 itself, such as the manufacturer, model name and model number, model revision of the IoT endpoint 106. Similarly, device properties 153 can include information such as identifiers of software packages 141 installed on the IoT endpoint 106, version information for software packages 141 installed on the IoT endpoint 106, and potentially other information.

A device campaign 133 can represent a set or collection of compliance policies 139 that have been assigned to one or more IoT endpoints 106. When an IoT endpoint 106 is assigned to a device campaign 133, the IoT management service 116 can cause any compliance policies 139 identified by or associated with the device campaign 133 to be enforced on the IoT endpoint 106, as later described. Accordingly, the device campaign 133 can include one or more policy identifiers 159 that identify individual compliance policies 139 assigned to or associated with the device campaign 133, and a list of enrolled device identifiers 161 that includes device identifiers 149 identifying device records 129 for IoT endpoints 106 subject to the device campaign 133. Other information can also be stored in a device campaign 133 as desired for individual implementations. In some implementations, the device campaign 133 can also include a software update package identifier that identifies the software update package 162 associated with the campaign.

A device campaign 133 can also be associated with one or more software update packages 162. A software update package 162 can be created with a package tool and bundles a software executable for installation on an IoT endpoint 106, a manifest file that specifies what is contained within the software update package 162, and one or more lifecycle scripts. In one implementation, each lifecycle phase can have a corresponding script that can be executed on the IoT endpoint 106 to perform the tasks associated with the phase. The software executable can comprise an installer or a firmware image that can be installed onto IoT endpoints 106 associated with the device campaign 133.

In some instances, the software update package 162 can include an executable program that, when executed by an IoT endpoint 106, installs or updates a respective application on the IoT endpoint 106. In other instances, the installer represents a package of files that, when unpacked by an application executing on the IoT endpoint 106, results in the installation of the respective application. Examples of software packages include MICROSOFT WINDOWS® MSI and PPKG files, REDHAT® Package Manager (RPM) files, DEBIAN® installer files, ANDROID® Package (APK) files, and similar package formats for applications of device firmware. A software update package 162 can include various metadata, such as a version identifier. The version identifier can indicate the version of the software update package 162 in order to differentiate between older and more recent versions of the software update package 162.

A compliance policy 139 represents a definition of a state in which an IoT endpoint 106 is required to be. For example, a compliance policy 139 can specify that an IoT endpoint 106 have a particular version or a minimum version of a software update package 162 installed. If the IoT endpoint 106 fails to have the version of the software update package 162 installed, then the IoT endpoint 106 can be considered to be non-compliant. Other examples of compliance policies 139 can include a requirement that a particular setting for an IoT endpoint 106 be enabled or disabled, a requirement that the IoT endpoint 106 be configured in a particular manner, or other requirements appropriate for particular implementations. A compliance policy 139 can also include a policy identifier 159 that uniquely identifies a compliance policy 139 with respect to other compliance policies 139. Examples of policy identifiers 159 can include an incremented integer or similar value, a GUID, a UUID, or similar unique identifier.

In some implementations, a compliance policy 139 can also specify a remedial action if the IoT endpoint 106 is determined at a later point in time to not be in a state consistent with the state specified by the compliance policy 139. For example, if the compliance policy 139 specifies that a particular version of a software update package 162 be installed on an IoT endpoint 106, the compliance policy 139 may also specify that if that version of the software update package 162 is not installed on the IoT endpoint 106, then the software update package 162 should be installed or reinstalled. Such remedial actions allow for non-compliant or formerly compliant IoT endpoints 106 to be brought into compliance.

A command queue 146 can represent a queue of commands sent from an IoT management service 116 to an IoT management agent 163. When the IoT management service 116 sends a command or instruction, such as a command to apply a software update specified in a device campaign 133 to an IoT endpoint 106, the command can be stored in the command queue 146 until the IoT management agent 163 retrieves the command from the command queue 146. In some instances, a dedicated command queue 146 can be created for each instance of an IoT management agent 163. In other instances, however, a single command queue 146 can be used to store commands intended for multiple IoT management agents 163. An IoT endpoint 106, device campaign 133, or IoT gateway 103 can be associated with their own respective command queues 146.

The IoT gateway 103 represents a computing device that acts as a proxy or relay between IoT endpoints 106a-n and the IoT Management service 116. For example, an IoT gateway 103 can represent a network access point or interface between the local area network 109 and the wide area network 113. In other instances, the IoT gateway 103 can be a dedicated device attached to the LAN 109 that communicates across the WAN 113 with the IoT management service 116 on behalf of IoT endpoints 106 attached to the LAN 109.

An IoT management agent 163 can be executed by the IoT gateway 103 to perform various functions on behalf of the IoT endpoints 106a-n. For example, the IoT management agent 163 can register or enroll IoT endpoints 106a-n with the IoT management service 116. As another example, the IoT management agent 163 can download, process, and enforce one or more applicable compliance policies 139. For instance, the IoT management agent 163 can retrieve a command from the command queue 146. The command can instruct the IoT management agent 163 to obtain a software update package 162 for a particular device campaign 133 and roll an update to IoT endpoints 106 using the IoT update handler 164. Accordingly, the IoT management agent 163 could then download the specified version of the software update package 162 and relay it to the respective IoT update handler 164 for installation on IoT endpoints 106.

The IoT update handler 164 can deploy software updates to IoT endpoints 106 that are managed by the IoT gateway 103. The IoT update handler 164 can extract a software executable from a software update package 162 and deploy the executable to IoT endpoints 106. The IoT update handler 164 can extract a manifest file that identifies one or more lifecycle scripts from the software update package 162. The IoT update handler 164 can cause the scripts to be executed on respective IoT endpoints 106 so that the various lifecycle phases of the update process are followed.

The lifecycle phases associated with rolling out a software update package 162 to IoT endpoints 106 can begin with an entry point phase. The entry point phase involves the downloading of a software executable from the software update package 162 to the IoT endpoint 106. The software executable can be downloaded from the IoT update handler 164. Additionally, other file dependencies, such as installation scripts, configuration files, or other data, can also be downloaded from the IoT update handler 164 to the IoT endpoint 106 during the entry point phase.

An entry point script can be bundled in software update package 162 and return an indication to the IoT update handler 164 of whether the entry point phase successfully completes. The entry point script can also include backup or reporting measures that can be run in the event that the download process was not successful. The backup or reporting measures can include a reference to a reset or rollback phase that can be executed to return the IoT endpoint 106 to its previous state from before commencement of the update rollout.

The second lifecycle phase can be a verification phase. The verification phase can be performed by a verification script bundled within the software update package 162 and referenced by the manifest file. The verification script can perform file validity checks on the files downloaded in the entry point phase. The verification script can also verify that the downloaded software executable in the software update package 162 has been downloaded to the correct location in the filesystem of the IoT endpoint 106. A checksum can be calculated based on the downloaded files and compared against an expected checksum contained within the verification script. The verification script can return an indication to the IoT update handler 164 of whether the downloaded files, such as the software executable, have been successfully verified. The verification script can be bundled in software update package 162 and return an indication to the IoT update handler 164 of whether the verification phase successfully completes. The verification script can also include backup or reporting measures that can be run in the event that the verification process was not successful. The backup or reporting measures can include a reference to a reset or rollback phase that can be executed to return the IoT endpoint 106 to its previous state from before commencement of the update rollout.

The third lifecycle phase can be an execution phase. The execution phase can be performed by an execution script bundled within the software update package 162 and referenced by the manifest file. The execution script can provide for custom executions that are needed to configure the IoT endpoint 106 after the software executable is verified. For example, a peripheral device might require installation or configuration. Configuration parameters might also require setting or custom values on the IoT endpoint 106. The execution script can return an indication to the IoT update handler 164 of whether the custom executions have been successfully fun. The execution script can be bundled in software update package 162 and return an indication to the IoT update handler 164 of whether the execution phase successfully completes. In some cases, the execution phase might have no steps that require execution on the IoT endpoint 106.

The execution script can also include backup or reporting measures that can be run in the event that the execution phase was not successful. The backup or reporting measures can include a reference to a reset or rollback phase that can be executed to return the IoT endpoint 106 to its previous state from before commencement of the update rollout.

The fourth lifecycle phase can be a validation phase. The validation phase can be performed by a validation script bundled within the software update package 162 and referenced by the manifest file. The validation script verifies that the software executable has been successfully installed and that the software is up and running on the IoT endpoint 106. The validation script can verify that the software rolled out to the IoT endpoint 106 has been successfully installed and is running on the IoT endpoint 106. The validation script can return an indication to the IoT update handler 164 of whether the software update has been successfully installed and is running on the IoT endpoint 106. The validation script can be bundled in software update package 162 and return an indication to the IoT update handler 164 of whether the validation phase successfully completes.

The validation script can also include backup or reporting measures that can be run in the event that the validation phase was not successful. The backup or reporting measures can include a reference to a reset or rollback phase that can be executed to return the IoT endpoint 106 to its previous state from before commencement of the update rollout.

The fifth lifecycle phase can be an activation phase. The activation phase can be performed by an activation script bundled within the software update package 162 and referenced by the manifest file. The activation script can make the application of the software update permanent on the IoT endpoint 106. Once the activation phase is complete, the reset or rollback phase can be unavailable to the IoT endpoint 106. The activation script can return an indication to the IoT update handler 164 of whether activation has been completed. The activation script can be bundled in software update package 162 and return an indication to the IoT update handler 164 of whether the activation phase successfully completes.

The activation script can also include backup or reporting measures that can be run in the event that the validation phase was not successful. The backup or reporting measures can include a reference to a reset or rollback phase that can be executed to return the IoT endpoint 106 to its previous state from before commencement of the update rollout.

A sixth lifecycle phase which is executed in the event of an error is a reset or rollback phase. The reset phase can be performed by reset script bundled within the software update package 162 and referenced by the manifest file. The reset script can rollback the software update to a previous version that was installed on the IoT endpoint 106. The reset script can be bundled in software update package 162 and return an indication to the IoT update handler 164 of whether the activation phase successfully completes.

The gateway data store 166 can be representative of a plurality of gateway data stores 166, which can include relational databases, object-oriented databases, hierarchical databases, hash tables or similar key-value data stores, as well as other data storage applications or data structures. The data stored in the gateway data store 166 is associated with the operation of the various applications or functional entities described below. This data can include one or more device records 129 of respective IoT endpoints 106*a-n*, any applicable compliance policies 139, and software update packages 162 obtained from the IoT management service 116 for rollout to IoT endpoints 106.

An IoT endpoint 106 is representative of any internet connected embedded device, appliance, sensor, or similar smart device. Examples of IoT endpoints 106 can include network connected home appliances (such as locks, refrigerators, thermostats, sprinkler controllers, smoke detectors, garage door openers, light-switches, fans, lights, security cameras, or similar devices), vehicular electronics (such as on-board diagnostic computers, entertainment systems, access controls, or similar devices), and other similar network connected devices. IoT endpoints 106 are often distinguishable from other client devices (such as personal computers or mobile devices) by their lack of functionality. For example, IoT endpoints 106 often do not provide general purpose computing abilities, lack an operating system that allows for a remote management service to gain direct administrative control over the IoT endpoint 106, and/or IoT endpoints 106 are not configured or configurable to execute an IoT management agent 163.

Often, an IoT endpoint 106 can also store a device identifier 149 that uniquely identifies the IoT endpoint 106 and one or more device properties 153. In some instances, one or more of these values can be set by the manufacturer. In other instances, one or more of these values can be set or specified by the IoT management service 116. An IoT endpoint 106 can run a particular operating system or shell environment that permits the execution of lifecycle scripts that correspond to the different lifecycle phases. The IoT endpoint 106 can also include a filesystem in which files obtained from the IoT update handler 164 can be stored.

Next, a general description of the operation of the various components of the networked environment 100 is provided.

However, more detailed descriptions of the operation of individual components of the networked environment 100 is set forth in the discussion of the subsequent figures.

To begin, a user can generate a software update package 162 that contains a software executable for installation on IoT endpoints 106 associated with as IoT gateway 103 or set of IoT gateways 103. The software update package 162 can be generated using a tool that packages the software executable along with one or more scripts corresponding to the various lifecycle phases into a file. The software update package 162 can also include a manifest file that references the components of the software update package 162. In some cases, other file dependencies and scripts can also be packaged into the software update package 162. In one implementation, the scripts corresponding to the lifecycle phases can have a predetermined name. For example, the entry point script can be in a file named entryPoint.sh, the verification script can be in a file named verify.sh, and so on. In some implementations, the manifest file can be separate from the software update package 162 rather than packaged into the package file.

Accordingly, the IoT update handler 164 can initiate execution of the scripts by the IoT endpoints 106 corresponding to the different lifecycle phases by executing the appropriate script with the filename that corresponds to the current lifecycle phase. For example, once the entry point script executes on the IoT endpoint 106 and returns an indication that execution was successful to the IoT update handler 164, the IoT update handler 164 can then initiate execution of the next lifecycle phase and its respective script. In one implementation, the phase following the entry point phase can be the verification phase.

The IoT update handler 164 can initiate execution of a lifecycle phase script on the IoT endpoint 106 by causing the IoT endpoint 106 to execute the script in a shell environment or operating system running on the IoT endpoint 106. The IoT update handler 164 can also obtain an indication of whether the script has successfully completed any tasks that are coded into the script from the shell environment of operating system.

In one implementation of the disclosure, the first four lifecycle phases can be ordered such that they always run in a predetermined order. These first four phases can be the entry point phase, the verification phase, the execution phase, and then the validation phase. The reset phase can act as a fallback or rollback phase for any of the above phases in the event that any return an indication that their execution was unsuccessful. In some cases, if the manifest file does not specify that a particular script must be executed for any of the first four phases, the IoT update handler 164 can determine that no action should be performed for that phase and that the phase is considered to be successfully passed. In this case, execution of the update process will move to the next lifecycle phase. The activation phase and the reset phase are mutually exclusive in that the IoT update handler 164 should only execute one of these phases. Depending upon the result of the validation phase, the software update process will either be activated or reset, but not both.

Figure 2:
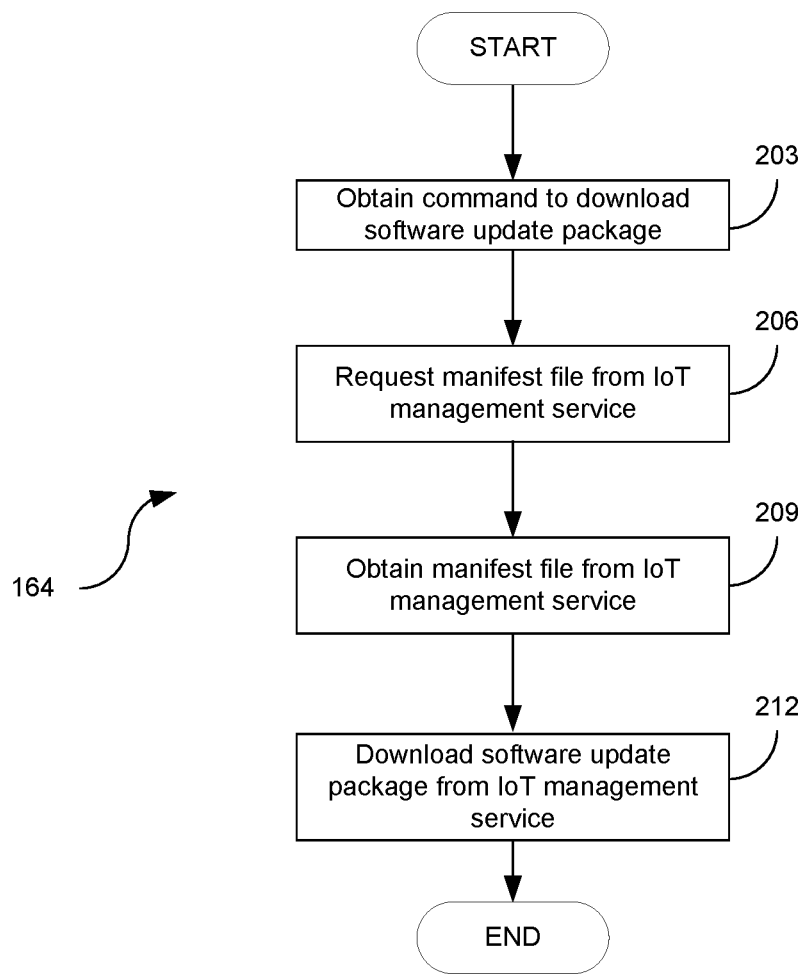
FIG. 2 is a flowchart depicting an example of the operation of components of the network environment of FIG. 1.

Referring next to FIG. 2, shown is a flowchart that provides one example of the operation of the IoT update handler 164. FIG. 2 provides merely an example of the many different types of functional arrangements that can be employed to implement the operation of the IoT update handler 164. As an alternative, the flowchart of FIG. 2 can be viewed as depicting an example of elements of a method implemented in the IoT gateway 163. FIG. 2 illustrates how the IoT update handler 164 can obtain a software update package 162 from the IoT management service 116 as a part of a device campaign 133 for a population of IoT endpoints 106.

Beginning at step 203, the IoT update handler 164 can obtain a command to download a software update package 162 from the IoT management service 116. The command can be generated in response to an administrator uploading a software update package 162 to the IoT management service 116 and/or establishing a device campaign 133 for a fleet of IoT endpoints 106. The command can also be generated automatically when an administrator provides a software update package 162 to the IoT management service 116.

At step 206, in response to receiving the command to download the software update package 162 from the IoT management service 116, the IoT update handler 164 can request a manifest file corresponding to the software update package 162 from the IoT management service 116 that corresponds to the device campaign 133. The manifest file can specify the lifecycle phases that should be executed for the update process as well as any optional lifecycle phases that should be executed. For example, the execution phase can provide for custom executions that are needed to configure the IoT endpoint 106 after the software executable is verified. For example, a peripheral device might require installation or configuration. Configuration parameters might also require setting or custom values on the IoT endpoint 106. The manifest file can include reference to a custom execution that are included within the software update package 162.

At step 209, the IoT update handler 164 can obtain the manifest file corresponding to the software update package 162 from the IoT management service 116. After obtaining the manifest file, the IoT update handler 164 can identify the contents of the software update package 162. For example, the software update package 162, in addition to mandatory lifecycle phase scripts, might also contain optional scripts and files that are associated with an execution phase. The manifest file can also identify the IoT endpoints 104 that are managed by the IoT gateway 104 to which a software update should be applied.

At step 212, the IoT update handler 164 can download the software update package 162 that corresponds to the manifest file obtained at step 209. The software update package 162 can contain a software executable for installation on the IoT endpoints 106, the lifecycle phase scripts that implement the various lifecycle phases on the IoT endpoints 106, and any other file dependencies, configuration files, or other executable files that are referenced by the manifest file or the lifecycle phase scripts. Accordingly, once the manifest file and software update package 162 have been obtained by the IoT update handler 164, the update campaign can be rolled out to the IoT endpoints 104. Thereafter, the process shown in FIG. 2 ends.

Figure 3:
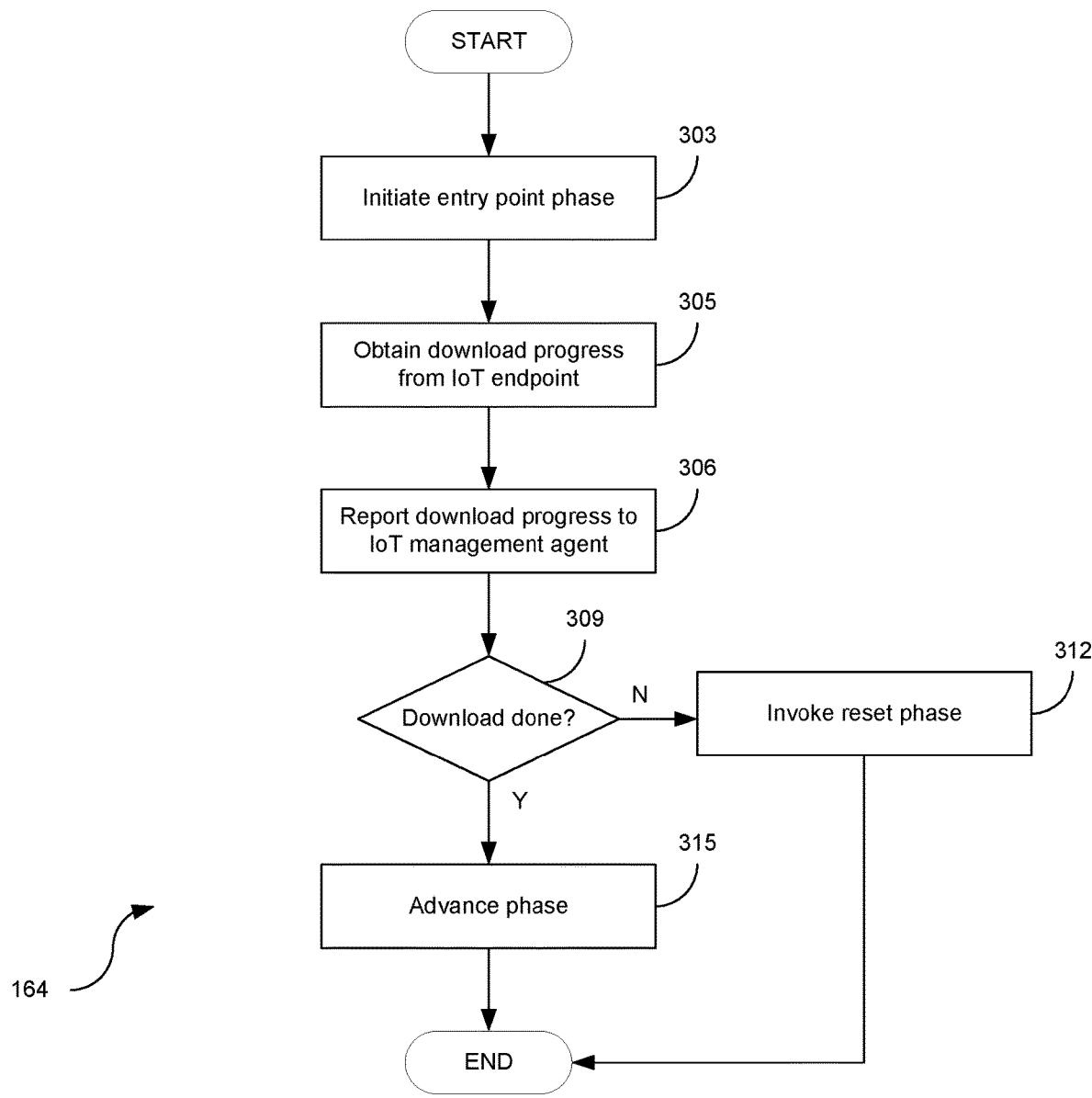
FIG. 3 is a flowchart depicting an example of the operation of components of the network environment of FIG. 1.

Referring next to FIG. 3, shown is a flowchart that provides one example of the operation of the IoT update handler 164. FIG. 3 provides merely an example of the many different types of functional arrangements that can be employed to implement the operation of the IoT update handler 164. As an alternative, the flowchart of FIG. 3 can be viewed as depicting an example of elements of a method implemented in the IoT gateway 163. FIG. 3 illustrates how the IoT update handler 164 can perform the entry point lifecycle phase.

As noted above, the entry point phase involves the downloading of a software executable from the software update package 162 to the IoT endpoint 106. The software executable can be downloaded from the IoT update handler 164. Additionally, other file dependencies, such as installation scripts, configuration files, or other data can also be downloaded from the IoT update handler 164 to the IoT endpoint 106 during the entry point phase.

First, at step 303, the IoT update handler 164 can initiate the entry point phase. The entry point lifecycle phase can be initiated by causing the IoT endpoint 106 to execute an entry point script that is bundled with the software update package 162. The IoT update handler 164 can transmit the entry point script to the IoT endpoint 106 and cause a shell environment or operating system of the IoT endpoint 106 to execute the entry point script. The entry point script can cause the IoT endpoint 106 to download a software executable containing firmware or an installer to update the IoT endpoint 106.

At step 305, in the entry point phase, the IoT update handler 164 can obtain download progress of the software executable by the IoT endpoint 106. The entry point script can report its download progress to the IoT update handler 164, or the IoT update handler 164 can track the download progress on behalf of the IoT endpoint 106.

At step 306, the IoT update handler 164 can report download progress of the software executable by the IoT endpoint 106 to the IoT management agent 163. In some implementations, the IoT management agent 163 can report the download progress of individual IoT endpoints 106 to the IoT management service 116 so that an administrator can view or track the status of the update process through an administrative console.

At step 309, the IoT update handler 164 can determine if the download of the software executable has been completed. The IoT update handler 164 can make this determination based upon whether the entry point script returns an indication that it successfully completed. If the entry point script returns an indication that it did not successfully complete or successfully download the software executable from the IoT update handler 164, the process can proceed to step 312. If the entry point script returns an indication that it did successfully complete or successfully download the software executable from the IoT update handler 164, the process can proceed to step 315.

At step 312, the IoT update handler 164 can invoke the reset lifecycle phase, or the reset script. The reset script can rollback the IoT endpoint 106 without installing the software update, as is described below. At step 315, the IoT update handler 164 can advance to the next lifecycle phase because the software executable has been successfully obtained. In one embodiment, the lifecycle following the entry point phase can be the verification phase, which is described in FIG. 4.

Figure 4:
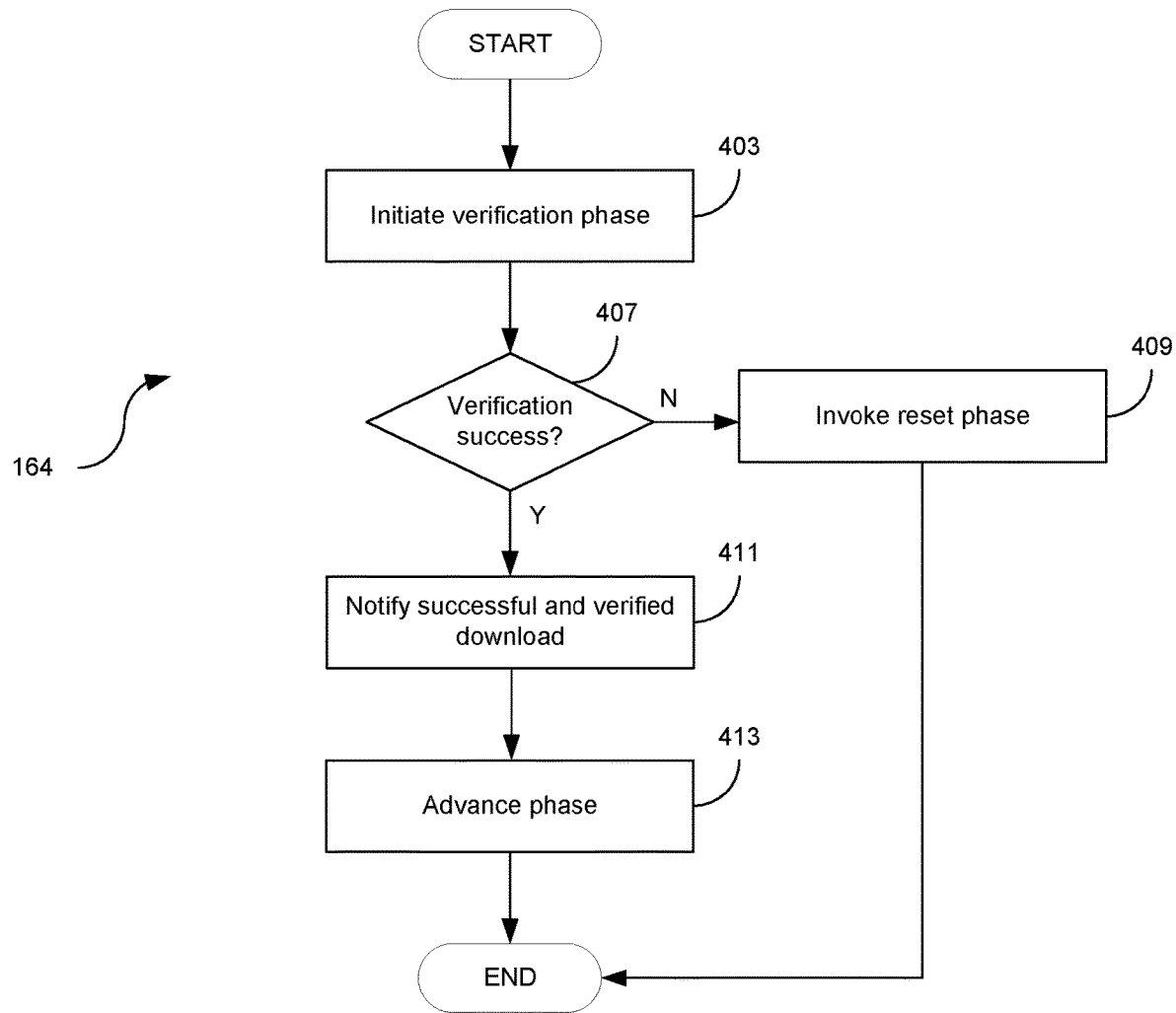
FIG. 4 is a flowchart depicting an example of the operation of components of the network environment of FIG. 1.

Referring next to FIG. 4, shown is a flowchart that provides one example of the operation of the IoT update handler 164. FIG. 4 provides merely an example of the many different types of functional arrangements that can be employed to implement the operation of the IoT update handler 164. As an alternative, the flowchart of FIG. 4 can be viewed as depicting an example of elements of a method implemented in the IoT gateway 163. FIG. 4 illustrates how the IoT update handler 164 can perform the verification lifecycle phase.

As noted above, the verification phase can involve file validity checks performed on the files downloaded in the entry point phase. The verification script can also verify that the downloaded software executable in the software update package 162 has been downloaded to the correct location in the filesystem of the IoT endpoint 106. A checksum can be calculated based on the downloaded files and compared against an expected checksum contained within the verification script. The verification script can return an indication to the IoT update handler 164 of whether the downloaded files, such as the software executable, have been successfully verified. The verification script can be bundled in software update package 162 and return an indication to the IoT update handler 164 of whether the verification phase successfully completes. The verification script can also include backup or reporting measures that can be run in the event that the verification process was not successful. The backup or reporting measures can include a reference to a reset or rollback phase that can be executed to return the IoT endpoint 106 to its previous state from before commencement of the update rollout.

Accordingly, at step 403 the IoT update handler 164 can initiate the verification phase. The verification lifecycle phase can be initiated by causing the IoT endpoint 106 to execute a verification script that is bundled with the software update package 162. The IoT update handler 164 can transmit the verification script to the IoT endpoint 106 and cause a shell environment or operating system of the IoT endpoint 106 to execute the verification script. The verification script can perform file validity checks on the files downloaded in the entry point phase. A checksum can be calculated based on the downloaded files and compared against an expected checksum contained within the verification script.

At step 407, the IoT update handler 164 can determine whether the verification script has successfully completed and whether verification of the software executable was successful. The verification script can return an indication to the IoT update handler 164 of whether the downloaded files, such as the software executable, have been successfully verified. The verification script can return an indication to the IoT update handler 164 of whether the verification phase successfully completes. If the verification phase unsuccessfully completes, the process proceeds to step 409. If the verification phase successfully completes, the process proceeds to step 411.

At step 409, the IoT update handler 164 can invoke the reset lifecycle phase, or the reset script. The reset script can rollback the IoT endpoint 106 without installing the software update. At step 411, the IoT update handler 164 can report to the IoT management agent that the download and verification of the software executable onto the IoT endpoint 106 was successful. At step 413, the IoT update handler 164 can advance to the next lifecycle phase because the software executable has been successfully obtained and verified. In one embodiment, the lifecycle following the verification phase can be the execution phase, which is described in FIG. 5.

Figure 5:
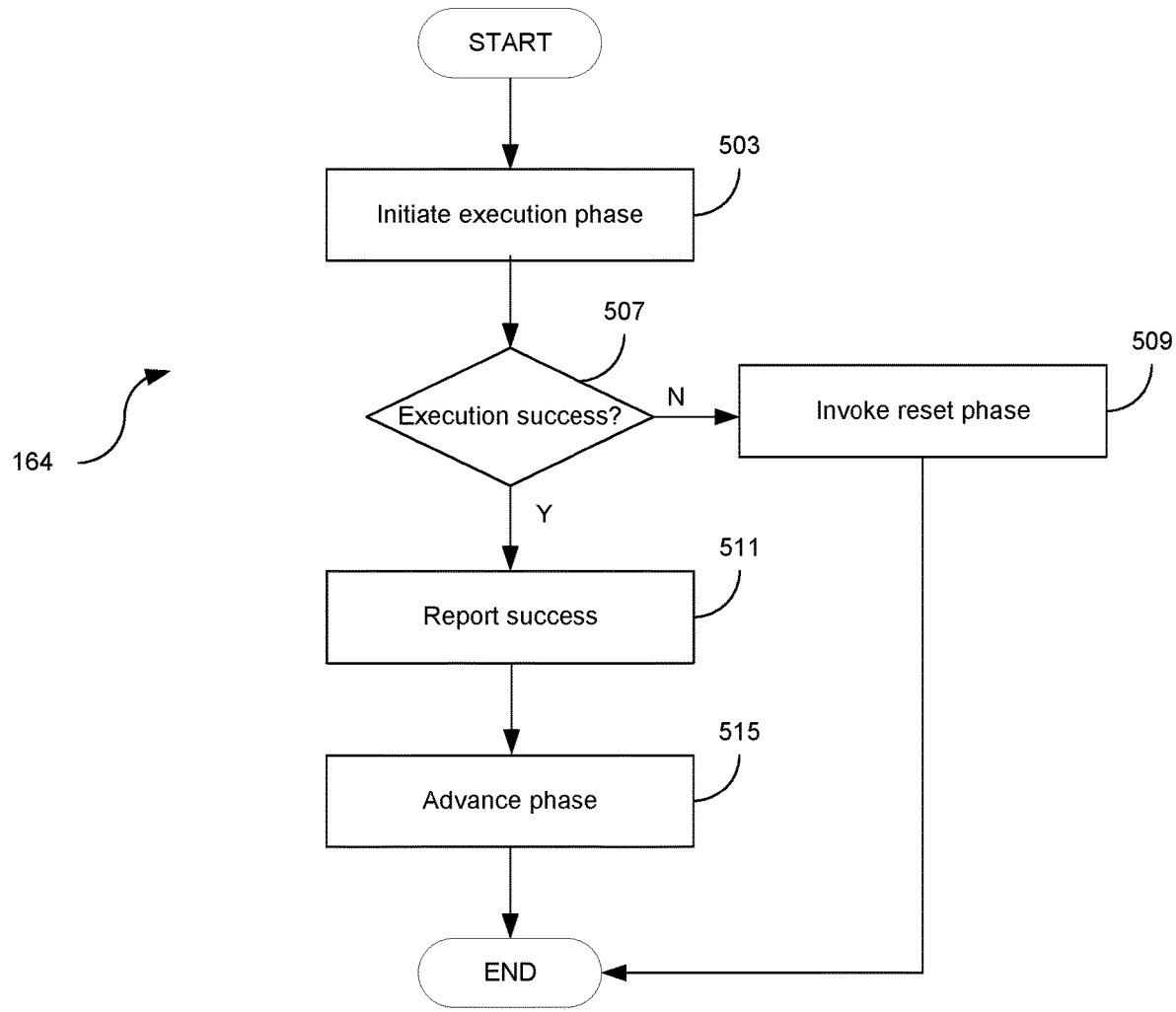
FIG. 5 is a flowchart depicting an example of the operation of components of the network environment of FIG. 1.

Referring next to FIG. 5, shown is a flowchart that provides one example of the operation of the IoT update handler 164. FIG. 5 provides merely an example of the many different types of functional arrangements that can be employed to implement the operation of the IoT update handler 164. As an alternative, the flowchart of FIG. 5 can be viewed as depicting an example of elements of a method implemented in the IoT gateway 163. FIG. 5 illustrates how the IoT update handler 164 can perform the execution lifecycle phase.

As noted above, the execution phase can involve custom executions that are needed to configure the IoT endpoint 106 after the software executable is verified. For example, a peripheral device might require installation or configuration. Configuration parameters might also require setting or custom values on the IoT endpoint 106. The execution script can return an indication to the IoT update handler 164 of whether the custom executions have been successfully fun. The execution script can be bundled in software update package 162 and return an indication to the IoT update handler 164 of whether the execution phase successfully completes. In some cases, the execution phase might have no steps that require execution on the IoT endpoint 106.

Accordingly, at step 503 the IoT update handler 164 can initiate the execution phase. The execution lifecycle phase can be initiated by causing the IoT endpoint 106 to execute an execution script that is bundled with the software update package 162. The IoT update handler 164 can transmit the execution script and any file dependencies required by the script to the IoT endpoint 106 and cause a shell environment or operating system of the IoT endpoint 106 to execute the script. The execution script can perform any executions or configuration of the IoT endpoint 106 in association with the updated software executable downloaded to the IoT endpoint 106.

At step 507, the IoT update handler 164 can determine whether the execution script has successfully completed and whether the software executable was installed as well as any custom executions performed. The execution script can return an indication to the IoT update handler 164 of whether the script successfully completed. If the execution phase unsuccessfully completes, the process proceeds to step 509. If the execution phase successfully completes, the process proceeds to step 511.

At step 509, the IoT update handler 164 can invoke the reset lifecycle phase, or the reset script. The reset script can rollback the IoT endpoint 106 without installing the software update. At step 511, the IoT update handler 164 can report to the IoT management agent that the execution phase was successful. At step 513, the IoT update handler 164 can advance to the next lifecycle phase because the execution phase completed successfully. In one embodiment, the lifecycle following the execution phase can be the validation phase, which is described in FIG. 6.

Figure 6:
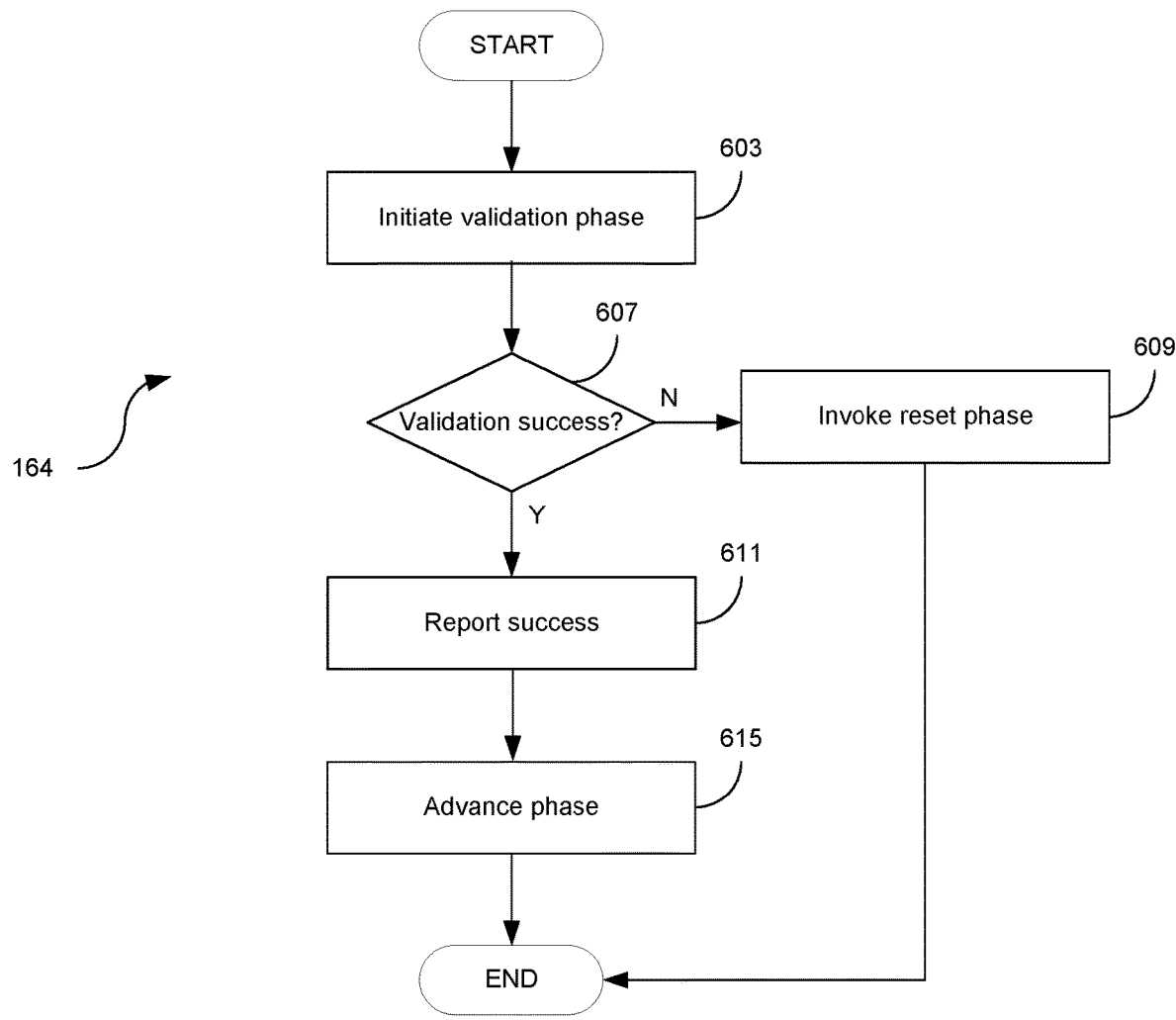
FIG. 6 is a flowchart depicting an example of the operation of components of the network environment of FIG. 1.

Referring next to FIG. 6, shown is a flowchart that provides one example of the operation of the IoT update handler 164. FIG. 6 provides merely an example of the many different types of functional arrangements that can be employed to implement the operation of the IoT update handler 164. As an alternative, the flowchart of FIG. 6 can be viewed as depicting an example of elements of a method implemented in the IoT gateway 163. FIG. 6 illustrates how the IoT update handler 164 can perform the validation lifecycle phase.

As noted above, the validation phase can verify that the software executable downloaded has been successfully installed and that the software is up and running on the IoT endpoint 106. The validation script can verify that the software rolled out to the IoT endpoint 106 has been successfully installed and is running on the IoT endpoint 106. The validation script can return an indication to the IoT update handler 164 of whether the software update has been successfully installed and is running on the IoT endpoint 106. The validation script can be bundled in software update package 162 and return an indication to the IoT update handler 164 of whether the validation phase successfully completes.

Accordingly, at step 603 the IoT update handler 164 can initiate the validation phase. The validation lifecycle phase can be initiated by causing the IoT endpoint 106 to execute a validation script that is bundled with the software update package 162. The IoT update handler 164 can transmit the validation script and any file dependencies required by the script to the IoT endpoint 106 and cause a shell environment or operating system of the IoT endpoint 106 to execute the script. The validation script can verify that the software executable and any custom configuration associated with the IoT endpoint 106 was performed.

At step 607, the IoT update handler 164 can determine whether the validation script has successfully completed and whether validation of the software executable was successful. The validation script can return an indication to the IoT update handler 164 of whether the script successfully completed. If the validation phase unsuccessfully completes, the process proceeds to step 609. If the validation phase successfully completes, the process proceeds to step 611.

At step 609, the IoT update handler 164 can invoke the reset lifecycle phase, or the reset script. The reset script can rollback the IoT endpoint 106 without installing the software update. At step 611, the IoT update handler 164 can report to the IoT management agent that the validation phase was successful. At step 613, the IoT update handler 164 can advance to the next lifecycle phase because the execution phase completed successfully. In one embodiment, the lifecycle following the execution phase can be the activation phase, which is described in FIG. 7.

Figure 7:
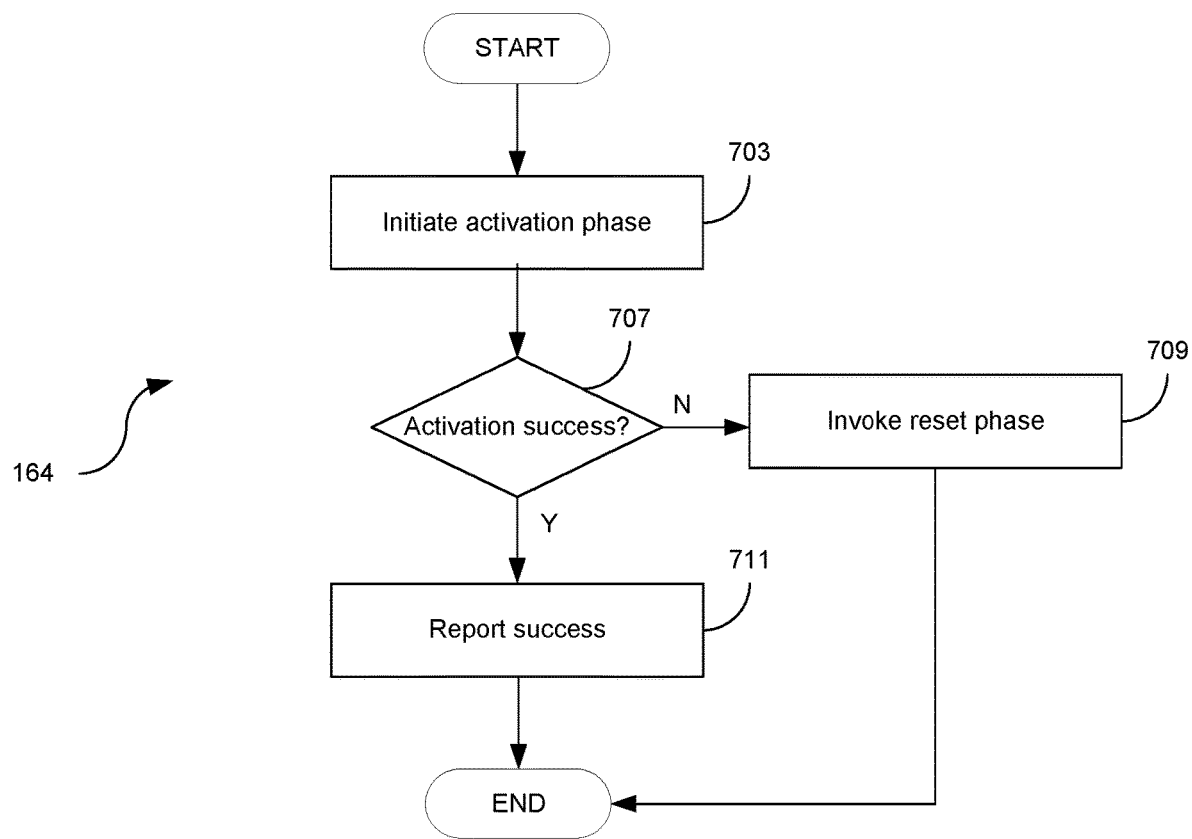
FIG. 7 is a flowchart depicting an example of the operation of components of the network environment of FIG. 1.

Referring next to FIG. 7, shown is a flowchart that provides one example of the operation of the IoT update handler 164. FIG. 7 provides merely an example of the many different types of functional arrangements that can be employed to implement the operation of the IoT update handler 164. As an alternative, the flowchart of FIG. 7 can be viewed as depicting an example of elements of a method implemented in the IoT gateway 163. FIG. 7 illustrates how the IoT update handler 164 can perform the activation lifecycle phase.

As noted above, the activation phase can make the application of the software update permanent on the IoT endpoint 106. Once the activation phase is complete, the reset or rollback phase can be unavailable to the IoT endpoint 106. The activation script can return an indication to the IoT update handler 164 of whether activation has been completed. The activation script can be bundled in software update package 162 and return an indication to the IoT update handler 164 of whether the activation phase successfully completes.

Accordingly, at step 703 the IoT update handler 164 can initiate the activation phase. The activation lifecycle phase can be initiated by causing the IoT endpoint 106 to execute an activation script that is bundled with the software update package 162. The IoT update handler 164 can transmit the activation script and any file dependencies required by the script to the IoT endpoint 106 and cause a shell environment or operating system of the IoT endpoint 106 to execute the script. The activation can make the installation of the software update or software executable permanent on the IoT endpoint 106.

At step 707, the IoT update handler 164 can determine whether the activation script has successfully completed and whether activation of the software executable was successful. The activation script can return an indication to the IoT update handler 164 of whether the script successfully completed. If the activation phase unsuccessfully completes, the process proceeds to step 709. If the validation phase successfully completes, the process proceeds to step 511.

At step 709, the IoT update handler 164 can invoke the reset lifecycle phase, or the reset script. The reset script can rollback the IoT endpoint 106 without installing the software update. At step 711, the IoT update handler 164 can report to the IoT management agent that the activation phase was successful. Thereafter, the process proceeds to completion, as installation of the software executable from the software update package 162 is complete.

Figure 8:
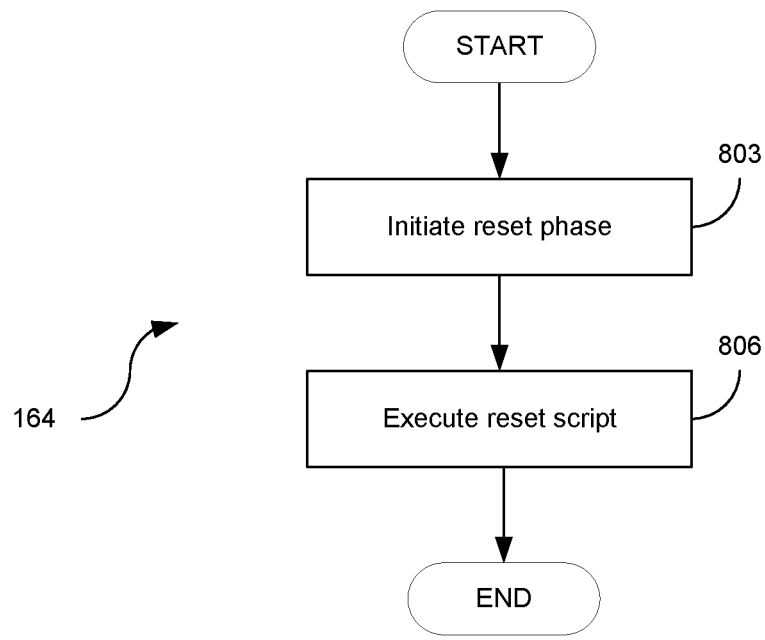
FIG. 8 is a flowchart depicting an example of the operation of components of the network environment of FIG. 1.

Referring next to FIG. 8, shown is a flowchart that provides one example of the operation of the IoT update handler 164. FIG. 8 provides merely an example of the many different types of functional arrangements that can be employed to implement the operation of the IoT update handler 164. As an alternative, the flowchart of FIG. 8 can be viewed as depicting an example of elements of a method implemented in the IoT gateway 163. FIG. 8 illustrates how the IoT update handler 164 can perform the reset phase.

As noted above, the reset phase can be performed by reset script bundled within the software update package 162 and referenced by the manifest file. The reset script can rollback the software update to a previous version that was installed on the IoT endpoint 106. The reset script can be bundled in software update package 162 and return an indication to the IoT update handler 164 of whether the activation phase successfully completes.

Accordingly, at step 803 the IoT update handler 164 can initiate the reset phase. The reset lifecycle phase can be initiated by causing the IoT endpoint 106 to execute a reset script that is bundled with the software update package 162. The reset script can be invoked when another lifecycle phase fails to successfully complete. The IoT update handler 164 can transmit the reset script to the IoT endpoint 106 and cause a shell environment or operating system of the IoT endpoint 106 to execute the script. The reset can roll back the software update so that the previous version of the software executable or firmware is installed on the IoT endpoint 106.

At step 806, the IoT update handler 164 can cause the reset phase to be executed by the IoT endpoint 106. Thereafter, the process proceeds to completion, as rollback of the IoT endpoint 106 to a previous installation of the software executable from the software update package 162 is complete.

Although the IoT management service 116, the IoT management agent 163, and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semi-conductor media. More specific examples of a suitable computer-readable medium include solid-state drives or flash memory. Any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system, comprising:
   a computing device comprising a processor and a memory;
   machine readable instructions stored in the memory that, when executed by the processor, cause the computing device to at least:
   obtain a command to initiate a device campaign for updating individual IoT endpoints assigned to an IoT management agent;
   download a software update package for installation on individual IoT endpoints, the software update package further comprising a manifest and at least one execution script corresponding to a plurality of lifecycle phases, wherein the lifecycle phases comprise at least an entry point phase, a verification phase, and an execution phase;
   for each of a plurality of individual IoT endpoints:
   initiate downloading of a software executable from the software update package to an IoT endpoint with an entry point script, the entry point script returning an indication to the computing device upon successful completion of the downloading;

verify integrity of the software update package downloaded to the IoT endpoint with a verification script, the verification script returning an indication to the computing device upon successful completion of verification of the software update package;

execute a validation script from the software update package to validate successful application of the software executable to the IoT endpoint; and execute an activation script to activate the software executable on the IoT endpoint; and report a status of the device campaign to the IoT management agent based upon a result obtained from each of the individual IoT endpoints.

2. The system of claim 1, wherein the machine readable instructions further cause the computing device to at least:

for each of the individual IoT endpoints, executing a customized script specified by the manifest, the customized script being executed after the verifying.

3. The system of claim 1, wherein the integrity of the software executable downloaded to the IoT endpoint is verified by initiating execution of a verification script that verifies the software executable, wherein the verification script is referenced by the manifest and included with the software update package.

4. The system of claim 1, wherein the successful application of the software executable is validated by initiating execution of a validation script referenced by the manifest and included with the software update package, the validation script confirming that the software executable is running on the IoT endpoint.

5. The system of claim 4, wherein the machine readable instructions further cause the computing device to at least reset the application of the software executable in response to the validation script indicating that the validation failed.

6. The system of claim 1, wherein the software executable on the IoT endpoint is activated by initiating execution of an activation script referenced by the manifest and included with the software update package, the activation script making installation of the software executable on the IoT endpoint permanent.

7. The system of claim 1, wherein the software package comprises an installer for the software executable that is executable by the individual IoT endpoints.

8. A method, comprising:
obtaining a command to initiate a device campaign for updating individual IoT endpoints assigned to an IoT management agent;

downloading a software update package for installation on individual IoT endpoints, the software update package further comprising a manifest and at least one execution script;

for each of a plurality of individual IoT endpoints:
corresponding to a plurality of lifecycle phases, wherein the lifecycle phases comprise at least an entry point phase, a verification phase, an execution phase, and a validation phase;

for each of a plurality of individual IoT endpoints:
initiating downloading of a software executable from the software update package to an IoT endpoint with an entry point script, the entry point script returning an indication to the computing device upon successful completion of the downloading;

verifying of the software update package downloaded to the IoT endpoint with a verification script, the verification script returning an indication to the computing device upon successful completion of verification of the software update package;

executing a validation script from the software update package to validate successful application of the software executable to the IoT endpoint; and executing an activation script to activate the software executable on the IoT endpoint; and reporting a status of the device campaign to the IoT management agent based upon a result obtained from each of the individual IoT endpoints.

9. The method of claim 8, further comprising, for each of the individual IoT endpoints, executing a customized script specified by the manifest, the customized script being executed after the verifying.

10. The method of claim 8, wherein verifying the integrity of the software executable downloaded to the IoT endpoint further comprises initiating execution of a verification script that verifies the software executable, wherein the verification script is referenced by the manifest and included with the software update package.

11. The method of claim 8, wherein validating successful application of the software executable further comprises initiating execution of a validation script referenced by the manifest and included with the software update package, the validation script confirming that the software executable is running on the IoT endpoint.

12. The method of claim 11, further comprising resetting the application of the software executable in response to the validation script indicating that the validation failed.

13. The method of claim 8, wherein activating the software executable on the IoT endpoint further comprises initiating execution of an activation script referenced by the manifest and included with the software update package, the activation script making installation of the software executable on the IoT endpoint permanent.

14. The method of claim 8, wherein the software package comprises an installer for the software executable that is executable by the individual IoT endpoints.

15. A non-transitory computer-readable medium, comprising machine readable instructions that, when executed by a processor, cause a computing device to at least:

obtain a command to initiate a device campaign for updating individual IoT endpoints assigned to an IoT management agent;

download a software update package for installation on individual IoT endpoints, the software update package further comprising a manifest and at least one execution script corresponding to a plurality of lifecycle phases, wherein the lifecycle phases comprise at least an entry point phase, a verification phase, and an execution phase;

for each of a plurality of individual IoT endpoints:
initiate downloading of a software executable from the software update package to an IoT endpoint with an entry point script, the entry point script returning an indication to the computing device upon successful completion of the downloading;

verify integrity of the software update package downloaded to the IoT endpoint with a verification point script, the verification script returning an indication to the computing device upon successful completion of verification of the software update package;

execute a validation script from the software update package to validate successful application of the software executable to the IoT endpoint; and execute an activation script to activate the software executable on the IoT endpoint; and report a status of the device campaign to the IoT management agent based upon a result obtained from each of the individual IoT endpoints.

16. The non-transitory computer-readable medium of claim 15, wherein the machine readable instructions further cause the computing device to at least:

for each of the individual IoT endpoints, executing a customized script specified by the manifest, the customized script being executed after the verifying.

17. The non-transitory computer-readable medium of claim 15, wherein the integrity of the software executable downloaded to the IoT endpoint is verified by initiating execution of a verification script that verifies the software executable, wherein the verification script is referenced by the manifest and included with the software update package.

18. The non-transitory computer-readable medium of claim 15, wherein the successful application of the software executable is validated by initiating execution of a validation script referenced by the manifest and included with the software update package, the validation script confirming that the software executable is running on the IoT endpoint.

19. The non-transitory computer-readable medium of claim 15, wherein the machine readable instructions further cause the computing device to at least reset the application of the software executable in response to the validation script indicating that the validation failed.

20. The non-transitory computer-readable medium of claim 15, wherein the software package comprises an installer for a binary application executable by the individual IoT endpoints or for a firmware for individual IoT endpoints.

* * * * *